(12) United States Patent
Shiokawa et al.

(10) Patent No.: US 7,380,619 B2
(45) Date of Patent: Jun. 3, 2008

(54) HANDLEBAR STEERED VEHICLE HAVING A STARTING CIRCUIT

(75) Inventors: Tatsuya Shiokawa, Wako (JP); Yoji Kanaoka, Wako (JP); Shinichi Maeda, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 404 days.

(21) Appl. No.: 11/019,199

(22) Filed: Dec. 23, 2004

(65) Prior Publication Data

US 2005/0140332 A1 Jun. 30, 2005

(30) Foreign Application Priority Data

Dec. 26, 2003 (JP) ............................. 2003-435157

(51) Int. Cl.
*B62K 11/14* (2006.01)
(52) U.S. Cl. ..................... 180/65.2; 180/219; 180/65.3
(58) Field of Classification Search ................ 180/219, 180/65.2, 65.3, 65.4, 65.8
See application file for complete search history.

(56) References Cited

U.S. PATENT DOCUMENTS

| | | | | |
|---|---|---|---|---|
| 5,217,087 A | * | 6/1993 | Ikegami et al. ............. 180/219 |
| 5,595,257 A | * | 1/1997 | Yoshida et al. ............. 180/287 |
| 6,218,804 B1 | * | 4/2001 | Toriyama et al. ........... 320/104 |
| 6,539,299 B2 | * | 3/2003 | Chatfield et al. ........... 701/104 |
| 6,555,928 B1 | * | 4/2003 | Mizuno et al. ........... 290/40 C |
| 2006/0032689 A1 | * | 2/2006 | Kojima et al. ............. 180/219 |
| 2006/0131959 A1 | * | 6/2006 | Nishijima et al. ......... 307/10.5 |
| 2006/0289208 A1 | * | 12/2006 | Katsuhiro et al. ......... 180/65.2 |

FOREIGN PATENT DOCUMENTS

JP 9-290684 11/1997

* cited by examiner

*Primary Examiner*—Jeffrey J Restifo
(74) *Attorney, Agent, or Firm*—Westerman, Hattori, Daniels & Adrian, LLP.

(57) ABSTRACT

A handlebar steered vehicle includes an operation lever provided on the steering handlebar, an operation detection switch for detecting an operation of the operation lever, and a starting circuit including a starting switch for connecting a battery with a starter motor, the operation detection switch and the starting switch being connected in series with the battery, such that the battery and the starter motor are connected to each other when the operation detection switch and the starting switch are tuned on. Further, a control unit drives a relay to connect the battery to a vehicle load, when an engine speed reaches or exceeds a predetermined value.

7 Claims, 8 Drawing Sheets

HANDLEBAR STEERED VEHICLE HAVING A STARTING CIRCUIT

FIELD OF THE INVENTION

The present invention relates generally to a vehicle and, more particularly, to an electricity supply device or starting circuit for a vehicle which is steered by a handlebar.

RELATED ART

A vehicle, which includes a generator and a battery and which turns on a headlamp by supplying the headlamp with electricity generated by the generator and/or stored in the battery, has found practical applications.

A principal switch, to which a name, such as a main switch, a combination switch, an ignition switch, or the like, is given, is generally interposed in an electric circuit for achieving the purpose noted above (see, for example, Japanese Patent Laid-open No. Hei 9-290684 (JP '684).

Referring to FIG. 1 of JP '684, an ignition switch with a reference numeral of S corresponds to the principal switch. Turning on (or closing) the ignition switch S puts an electric circuit into an active state. As described in the foregoing, an ordinary vehicle is provided with the principal switch and it is prerequisite that this principal switch be turned on before the vehicle shifts from a ready state to a running-enabled state.

There is a demand for a vehicle that dispenses with the principal switch for reasons of applications in racing or for a reduction in the number of switch components.

It is, however, readily impossible to dispense with the ignition switch S disclosed in JP '684, since the switch S connects and disconnects a circuit between the battery and the headlamp.

To state it another way, to dispense with a principal switch, such as the ignition switch S, it becomes necessary to configure a special electric circuit.

SUMMARY OF THE INVENTION

An object of the present invention is to provide an electricity supply device particularly suitable for a racing vehicle that is not provided with the principal switch, ensures good starting, and that does not allow the battery thereof to run down by devising the electronic circuit.

In a first aspect of the present invention, a handlebar steered vehicle includes an operation lever, an operation detection switch, and a starting circuit. The operation lever is provided on a steering handlebar. The operation detection switch detects an operation of the operation lever. The starting circuit includes a starting switch for connecting a battery with a starter motor.

The vehicle is characterized by the following. Specifically, only the operation detection switch and the starting switch are connected in series with the battery. The battery and the starter motor are connected when the operation detection switch and the starting switch are turned on (or closed). A control unit is also provided for driving a relay. The relay connects the battery to a vehicle load when an engine speed reaches or exceeds a predetermined value.

In a second aspect of the present invention, the vehicle includes a headlight and a generator for generating electricity using an output from an engine. The vehicle is characterized in that the headlight is directly connected to the generator.

In a third aspect of the present invention, the control unit is an ignition control unit for the vehicle.

In a fourth aspect of the present invention, the operation lever is disposed on a side of the steering handlebar opposite to a side on which the starting switch is provided.

According to the first aspect of the present invention, the starter motor is turned to start the engine when the following two conditions are met: specifically, the operation lever is operated and the starting switch is pressed. This provides a vehicle capable of starting the engine without being provided with the principal switch typically represented by the ignition switch. There is no likelihood of erroneous operation, since the engine cannot be started only with the starting switch.

In addition, a general load is connected to a main circuit including the battery by way of a relay that turns on when the engine speed reaches or exceeds a predetermined value. This allows a supply of electricity flowing to the general load to be shut down when the engine is not running. As a result, a rundown battery can be avoided.

According to the second aspect of the present invention, the headlight is directly connected to the generator. This means that the generator can shoulder the burden of supplying electricity to the headlight. As a result, the load on the battery mounted on the vehicle can be reduced, thus extending the life of the battery.

According to the third aspect of the present invention, the control unit is the ignition control unit for the vehicle. This eliminates the need for providing a separate control unit, thus avoiding an increased cost.

According to the fourth aspect of the present invention, the operation lever is disposed on a side of the steering handlebar opposite to the side on which the starting switch is provided. This results in the operability of the operation lever and of the starting switch being enhanced.

The best mode for carrying out the present invention will be described with reference to the accompanying drawings. The drawings should be viewed in the direction of reference numerals.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
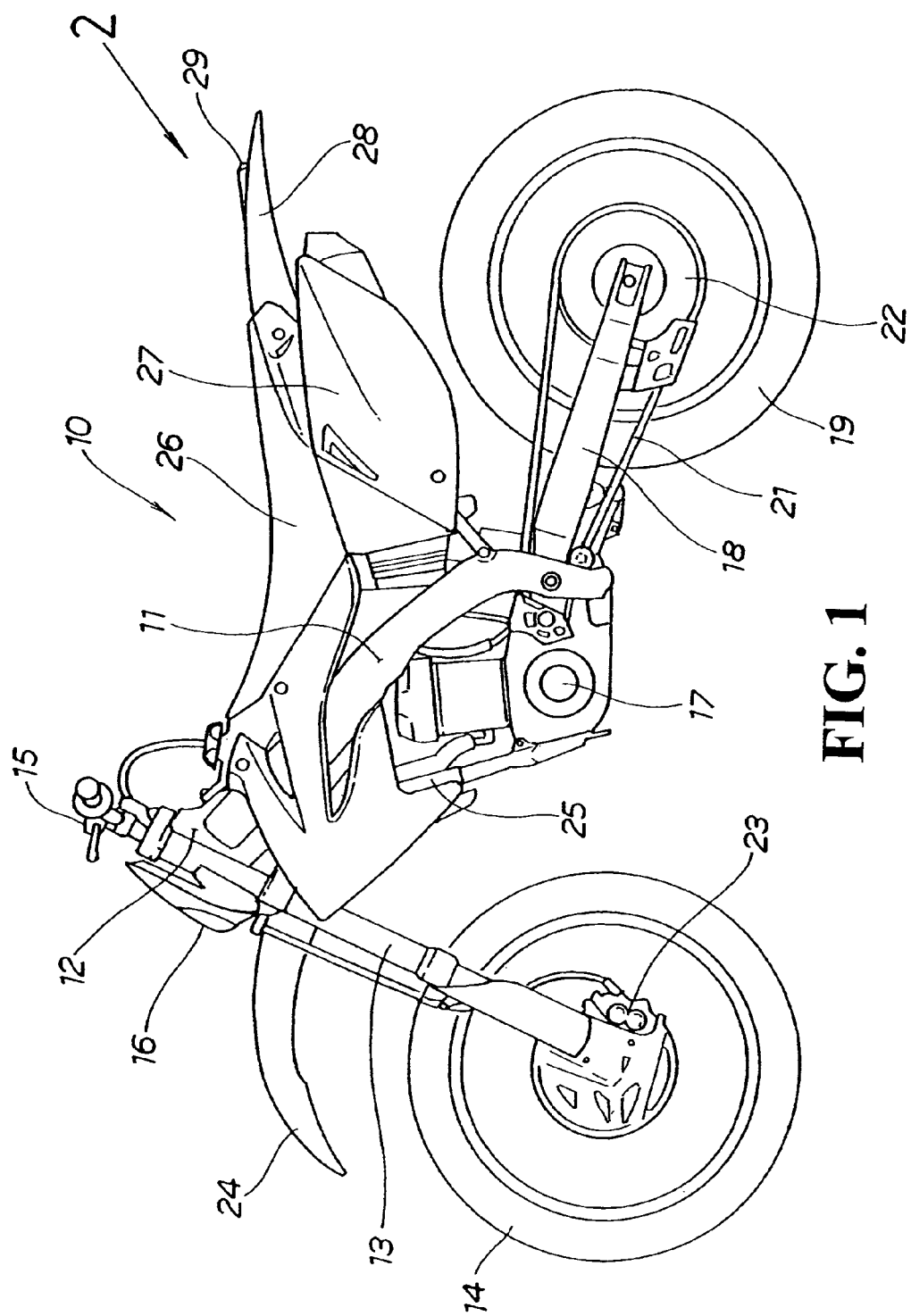
FIG. 1 is a side elevational view showing a vehicle according to the present invention.

FIG. 1 is a side elevational view showing a vehicle according to the present invention. A vehicle 10 may typically be a motorcycle, or a racing vehicle running on an unpaved road or the like of a closed course. The vehicle 10 is typically configured as follows. Specifically, a head pipe 12 is provided at a front end of a vehicle body frame 11. A front fork 13 is provided for the head pipe 12. A front wheel 14 is rotatably mounted on a lower portion of the front fork 13. A steering handlebar 15 is attached to an upper end of the front fork 13. A headlight 16 is provided on the head pipe 12. An engine 17 is mounted at a center of the vehicle body frame 11. A swing arm 18 is extended from a rear portion of the vehicle body frame 11. A rear wheel 19 is rotatably mounted at a rear portion of the swing arm 18. The rear wheel 19 is driven by the engine 17 by means of a chain 21 and a sprocket 22. The vehicle 10 is mounted only with minimum essential auxiliaries, including the headlight and a tail light.

The vehicle 10 includes a kick start pedal not shown. The engine can be started also by depressing the kick start pedal.

Reference numeral 23 represents a brake caliper. Reference numeral 24 represents a front fender. Reference numeral 25 represents a cooling fan motor. Reference numeral 26 represents a seat. Reference numeral 27 represents a rear side cover. Reference numeral 28 represents a rear fender. Reference numeral 29 represents a tail light.

Figure 2:
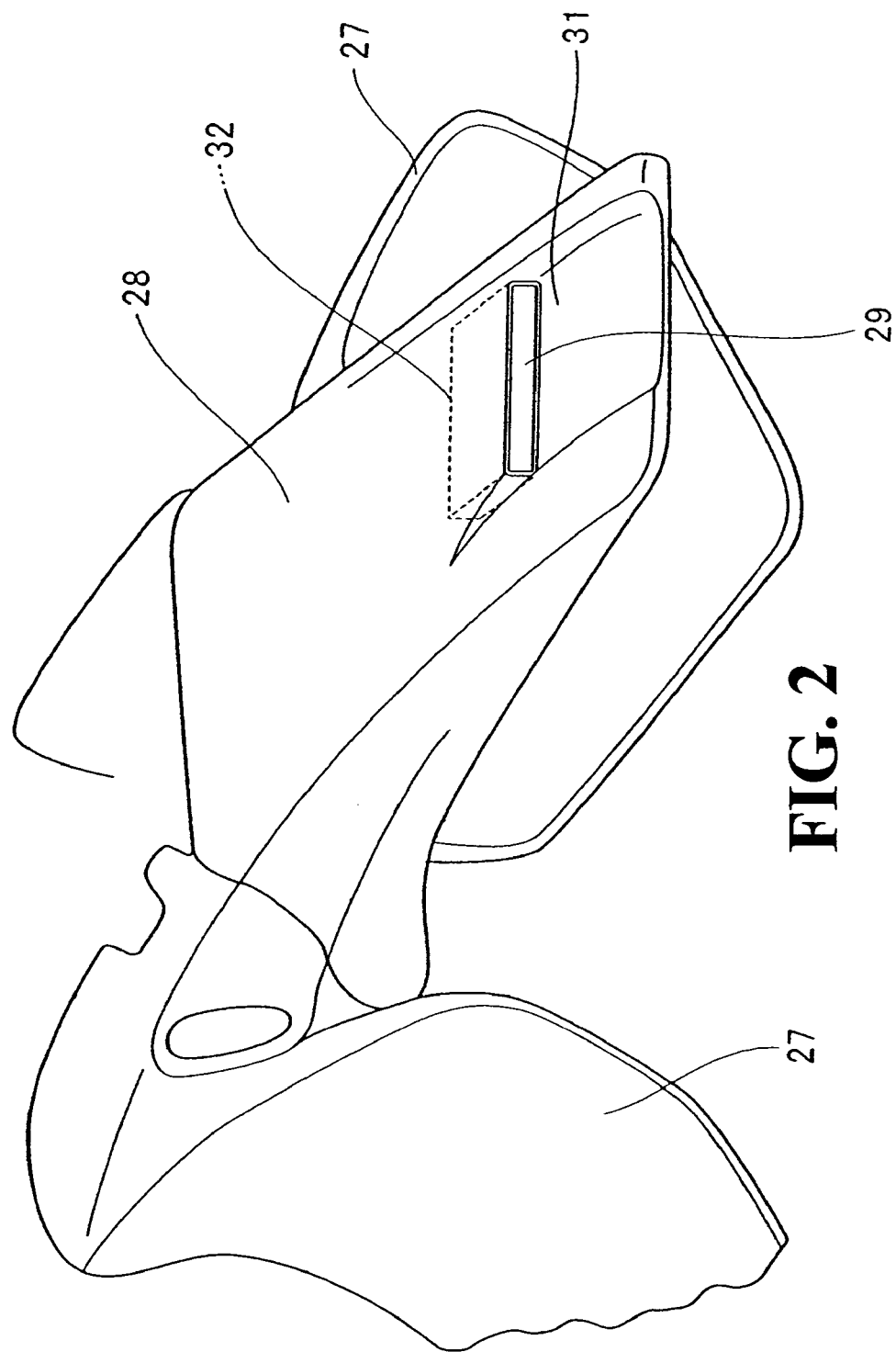
FIG. 2 is a view in the direction of arrow 2 of FIG. 1.

FIG. 2 is a view in the direction of arrow 2 of FIG. 1. FIG. 2 shows that the tail light 29 is composed as follows. Specifically, a step portion 31 is provided on a rear portion of the rear fender 28. A crosswise slit is made in a vertical wall portion of the step portion 31. A tail light unit 32 with a built-in LED (Light Emitting Diode) is then fitted into this crosswise slit.

Figure 3:
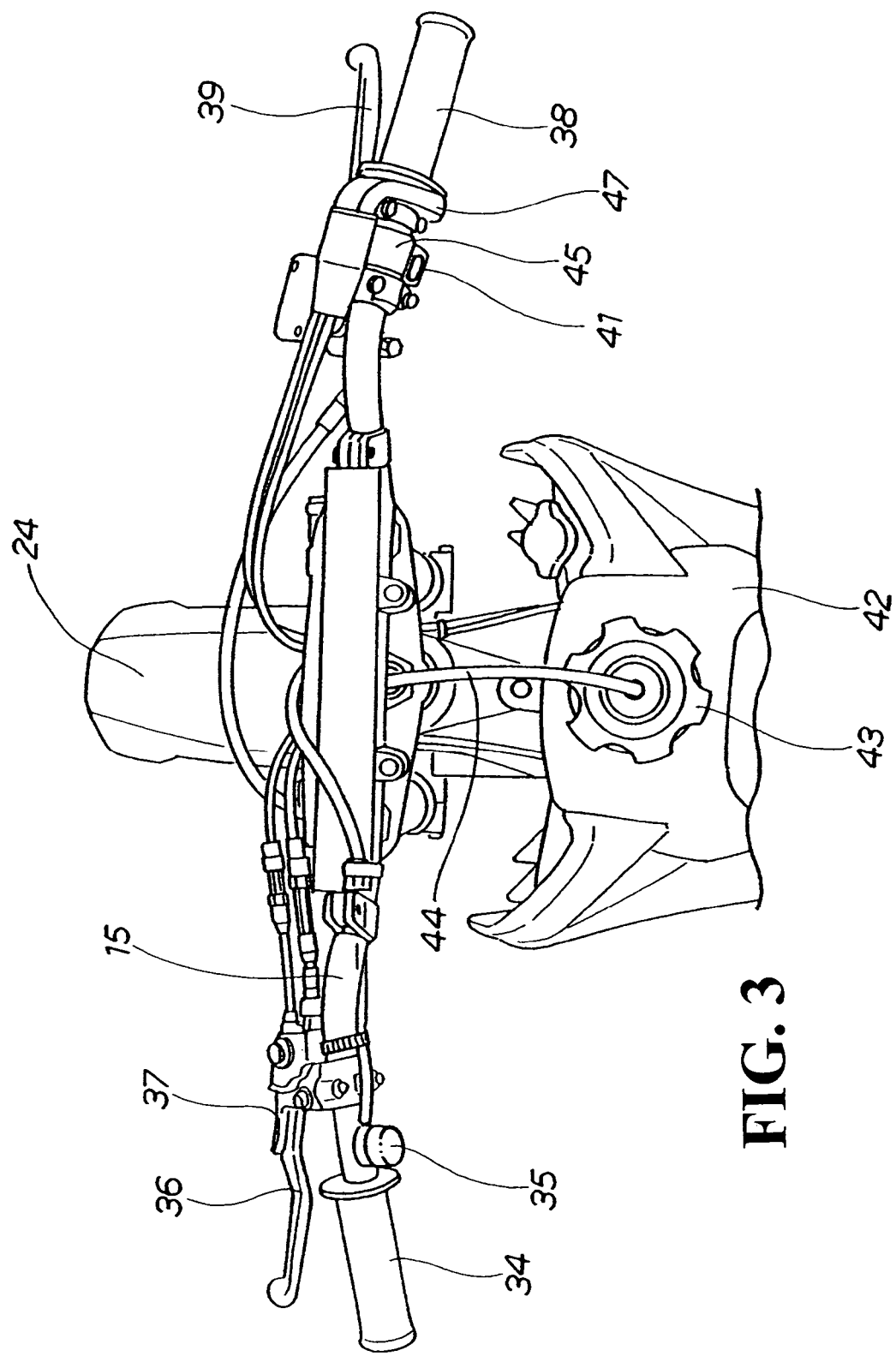
FIG. 3 is a plan view showing a front portion of the vehicle according to the present invention.

FIG. 3 is a plan view showing a front portion of the vehicle according to the present invention. FIG. 3 shows different parts (described below) mounted on the steering handlebar 15 of a bar handle shape. Specifically, an engine stop switch 35, and a clutch lever 36, and a hot start lever 37 as operation levers are mounted in areas near left grip 34. A front brake lever 39 and a starting switch 41 are mounted in areas near right throttle grip 38. Reference numeral 42 represents a fuel tank. Reference numeral 43 represents a fuel filler cap. Reference numeral 44 represents an air vent pipe.

A feature of the present invention includes mounting a switch box 45, including the starting switch 41, according to the preferred embodiment of the present invention. An explanation of the feature is set forth below.

Figure 4:
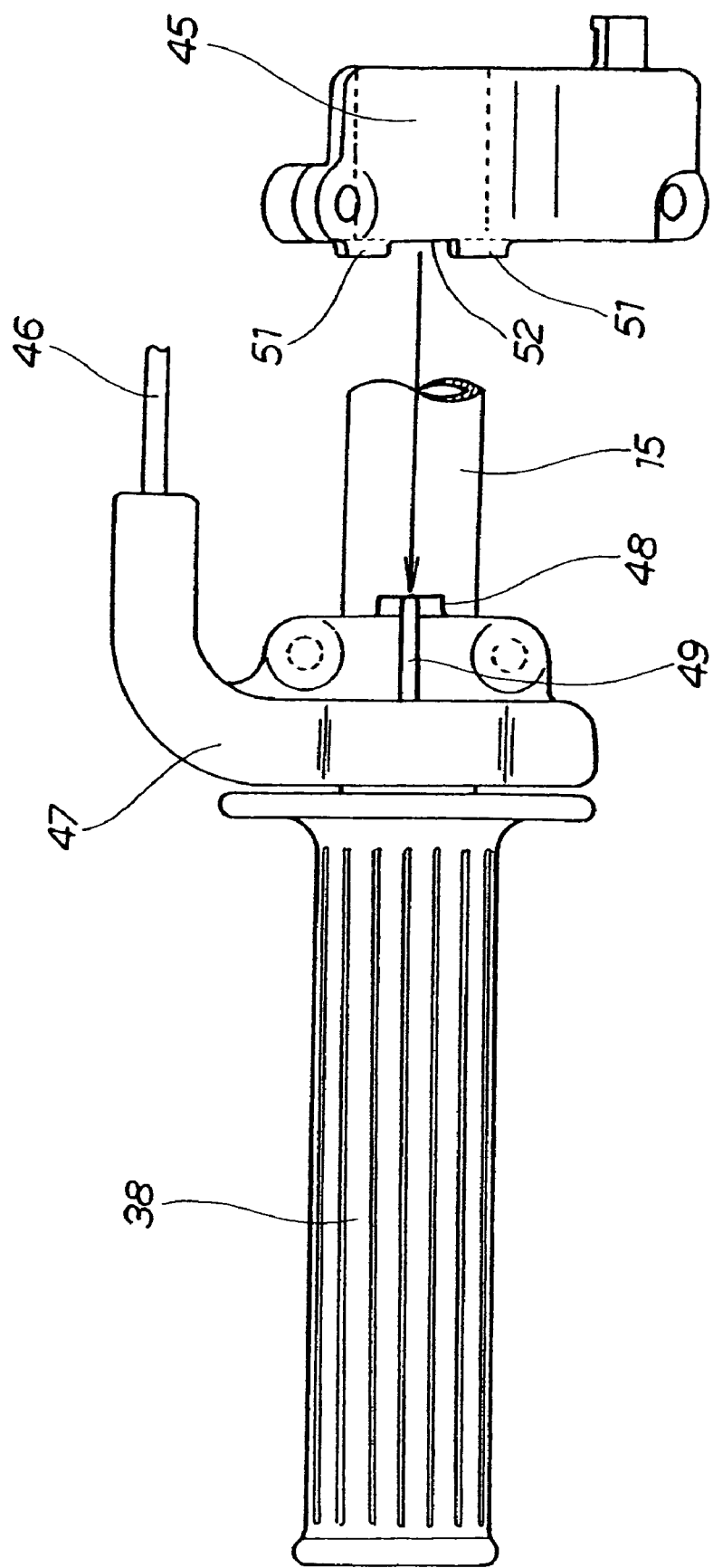
FIG. 4 is a view showing the right throttle grip as viewed from the front.

FIG. 4 is a view showing the right throttle grip as viewed from the front. A throttle cable 46 for transmitting an amount of rotation of the throttle grip 38 extends from a throttle housing 47. Specifically, the throttle housing 47 has a built-in mechanism for translating the amount of rotation to a corresponding amount of linear movement. The throttle housing 47 is rigidly mounted to the steering handlebar 15.

A rectangular protrusion 48 is provided in a protruding condition rightwardly in FIG. 4 from a front portion of the throttle housing 47. Reference numeral 49 represents a reinforcement rib for reinforcing the protrusion 48. The reinforcement rib 49 substantially enhances a bending stiffness of the protrusion 48 in a front-to-back direction of FIG. 4.

Two tabs 51, 51 are extended leftwardly in FIG. 4 from a front portion of the switch box 45. A rectangular recess 52 is then formed between these two tabs 51, 51. Dimensions of the recess 52 correspond to the protrusion 48.

The switch box 45 is mounted to the steering handlebar 15 such that the protrusion 48 fits into the recess 52. Detailed procedures for mounting the switch box 45 to the steering handlebar 15 will be described below.

Figure 5:
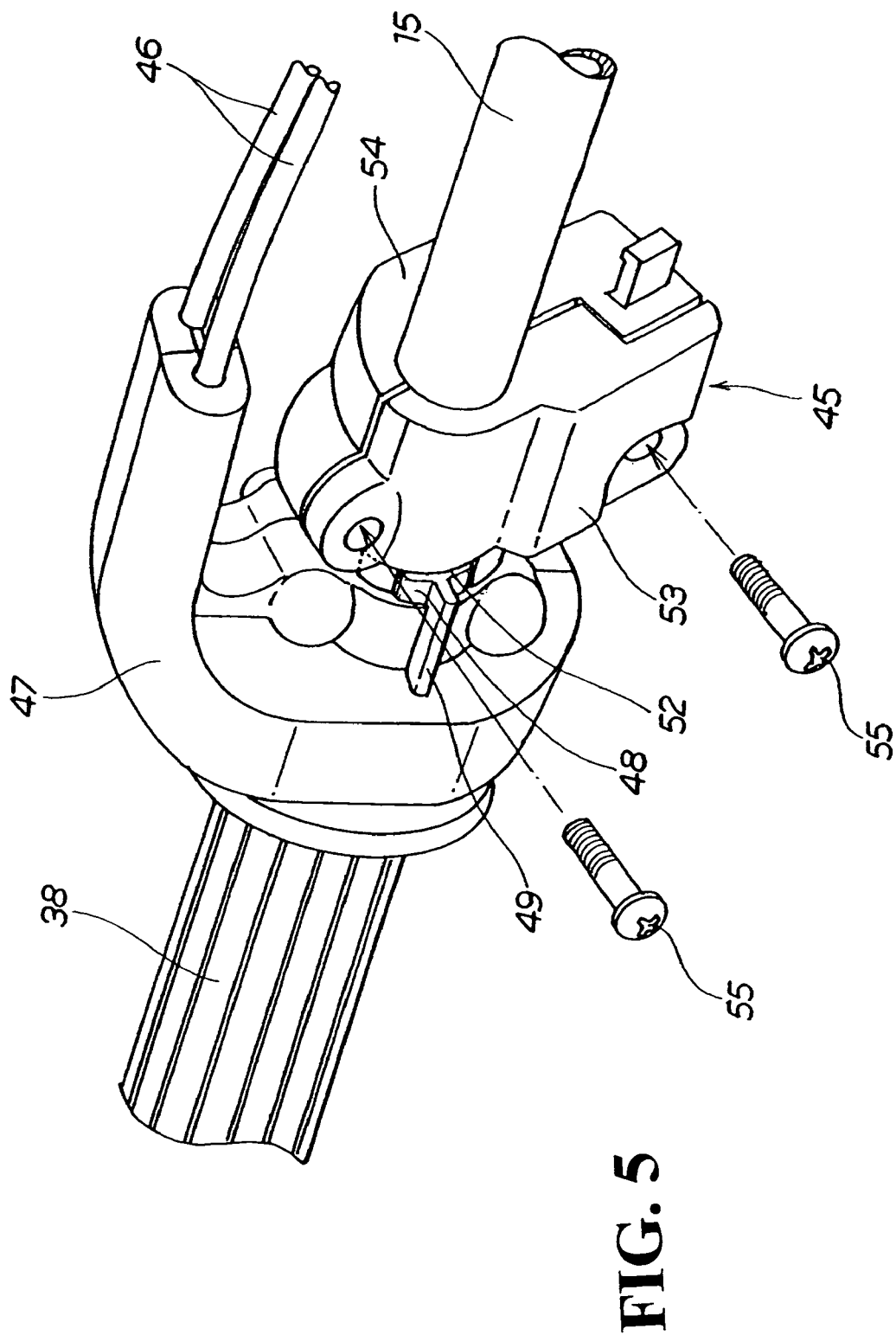
FIG. 5 is a perspective view illustrating procedures for mounting a switch box according to a preferred embodiment of the present invention.

FIG. 5 is a view for explaining procedures for mounting the switch box according to the preferred embodiment of the present invention. The switch box 45 includes: a box front portion half body 53 having the recess 52; a box rear portion half body 54 having the starting switch (identified by reference numeral 41 in FIG. 3); and screws 55, 55 for joining together half bodies 53 and 54.

The box front portion half body 53 is first disposed such that the recess 52 fits into the protrusion 48 of the throttle housing 47. Then, the box front portion half body 53 is mated with the box rear portion half body 54. The screws 55, 55 are then tightened to join the box rear portion half body 54 with the box front portion half body 53. At the same time, half bodies 53, 54 are supported on the steering handlebar 15 by sandwiching handlebar 15 between the box front portion half body 53 and the box rear portion half body 54.

When a rider presses the starting switch (identified by the reference numeral 41 in FIG. 3), a moment acts on the switch box 45 such that a force acts to rotate the switch box 45 about the steering handlebar 15. According to the embodiment of the present invention, the recess 52 in the switch box 45 fits over the protrusion 48 of the throttle housing 47. This effectively inhibits the switch box 45 from rotating.

To mount the switch box 45 having a two-separable-part structure on the steering handlebar 15 made of steel pipe, it is common practice to inhibit the switch box 45 from turning by making a hole in the steering handlebar 15 made of steel pipe and fitting the protrusion provided on the switch box 45 into the hole. This requires an additional process of making a hole in the steering handlebar 15, resulting in an increased cost. Moreover, there is a trace of the hole left in the steering handlebar 15.

In this respect, in accordance with the embodiment of the present invention, the switch box 45 is engaged with the throttle housing 47 for achieving locking of the switch box 45. This eliminates the need for making a hole, and thus no hole is made in the steering handlebar 15.

Figure 6:
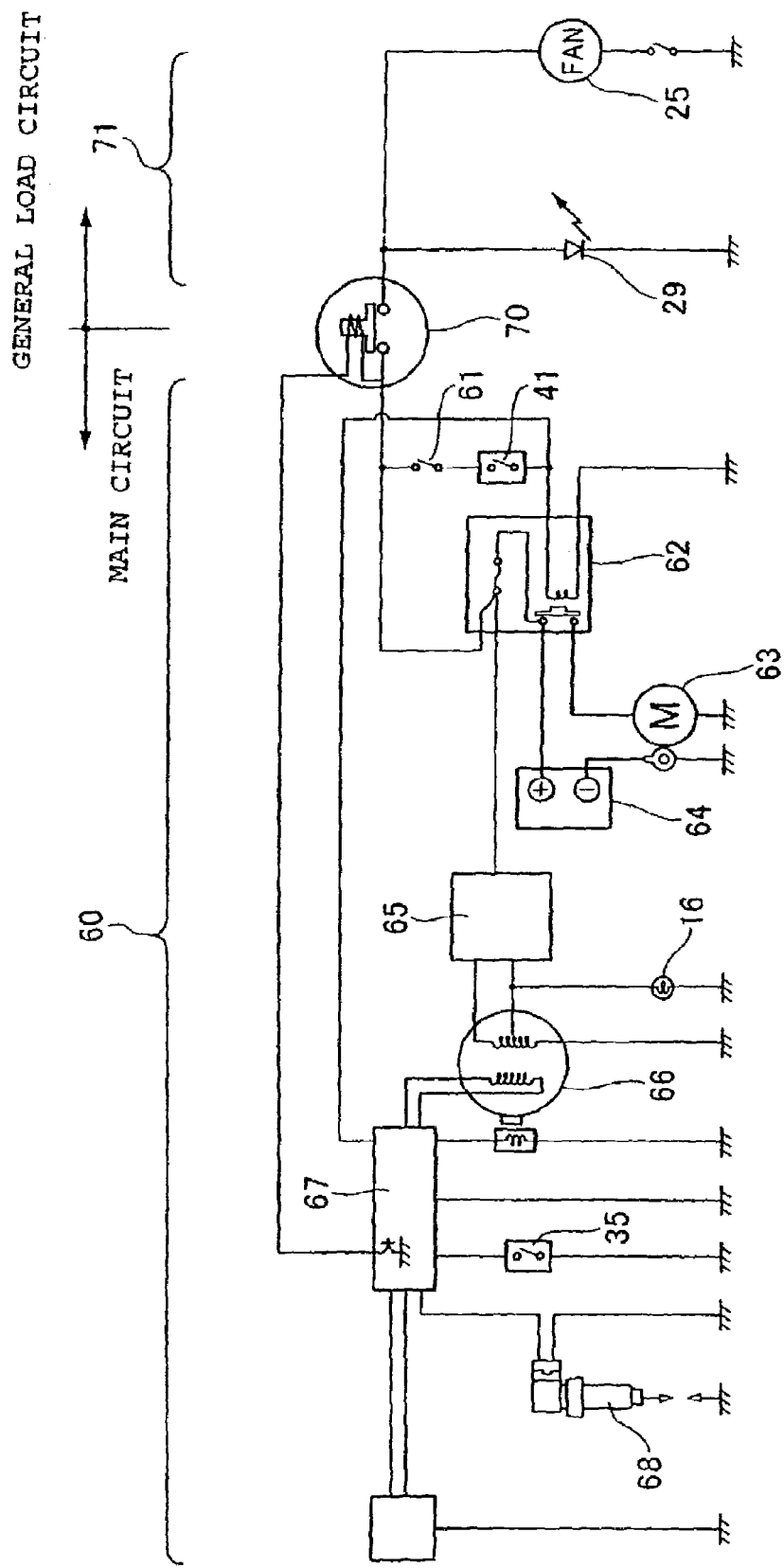
FIG. 6 is an electric circuit diagram applied to the vehicle according to the present invention.

FIG. 6 is an electric circuit diagram applied to the vehicle according to the present invention. The electric circuit is characterized in that a general load circuit 71 is connected to a main circuit 60 via relay 70. The main circuit 60 includes a clutch switch 61 serving as the operation detection switch for the operation lever, starting switch 41, a starter magnet 62, a starter motor 63, a battery 64, a regulator 65, the headlight 16, a generator 66, an ignition control unit 67 serving as the ignition control means, an engine stop switch 35, and an ignition coil 68. The general load circuit 71 includes the cooling fan motor 25 and the tail light 29. Specifically, the electric circuit is characterized in that the general load circuit 71 can be disconnected from the main circuit 60 through the relay means 70. The ignition control unit 67 is the control unit for driving the relay 70.

In the main circuit 60, turning on both the clutch switch 61 and the starting switch 41 allows the starter motor 63 to be rotated using the battery 64.

The relay means 70 turns on when the engine speed is a predetermined value, which is slightly lower than an idle speed, or more. The relay means 70 turns on to supply current from the battery and/or the generator to general loads, thus turning the cooling fan motor 25 and lighting up the tail light 29.

A control circuit for the relay 70 is integrated with the ignition control unit receiving an engine speed signal. This helps reduce the number of parts used and makes the circuit more compact.

The headlight 16 is directly connected to the generator 66. This makes the generator 66 shoulder the burden of supplying electricity for headlight 16. This, in turn, reduces loads on the battery 64, thus extending the life of the battery 64. The relay 70 can be built compactly, since there is no need to pass current for the headlight to the relay 70.

Figure 7:
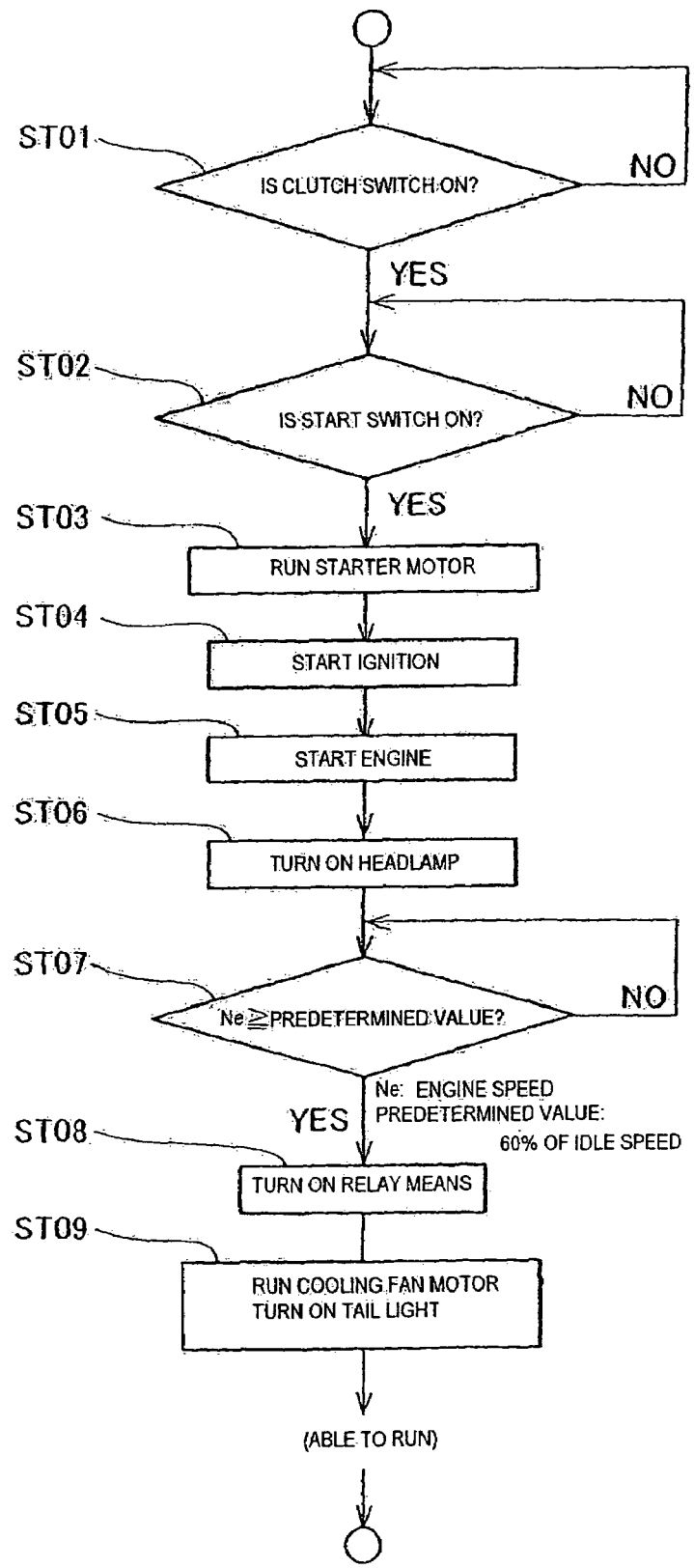
FIG. 7 is an operational flowchart for starting the vehicle according to the present invention.

FIG. 7 is an operation flowchart at the starting of the vehicle according to the present invention. STXX represents a step number (where XX is the actual number). The vehicle according to the present invention is capable of being kick started. An operation flow for kick starting will be described with reference to another figure.

ST01: A determination is made as to whether or not the clutch switch is turned on. Specifically, an affirmative determination is made by gripping the clutch lever shown in FIG. 3.

ST02: A determination is made as to whether or not the starting switch is on. Specifically, an affirmative determination is made by pressing the starting switch 41 shown in FIG. 3.

ST03: The starter magnet 62 is energized causing current to flow from the battery 64 to the starter motor via the starter magnet 62, thus turning the starter motor.

ST04: When the engine turns over (or starts to rotate), current is supplied from the generator to the ignition coil 68 through the ignition control unit 67, thus causing a spark plug to produce a prescribed spark.

ST05: This starts the engine.

ST06: At the same time, current is supplied from the generator 66 to the headlight, thus turning on the headlight.

ST07: A determination is made as to whether or not an engine speed Ne has reached a predetermined value (e.g., 60% of the idle speed).

ST08: If an affirmative determination is made in ST07, the relay means is turned on.

ST09: This causes the cooling fan motor as a general load to start turning, and the tail light to light up.

The vehicle is now able to run, since energization of the general load has been started and the engine is in a rotating state.

The operation flow described heretofore is given for descriptive purposes of explaining operations of the electric circuit shown in FIG. 6. FIG. 6 should be taken as being correct for any portions of the operation flow that are inaccurate.

To bring the engine that has been started to a stop, it is necessary to simply press the engine stop switch 35 shown in FIGS. 3 and 6.

In accordance with the preferred embodiment of the present invention described above, turning on both the clutch switch and the starting switch is the condition for starting. The clutch switch may, however, be replaced by a front brake switch or any other operation detection switch.

To state it another way, the conditions for starting are: the operation of the operation lever+turning on of the start switch.

Figure 8:
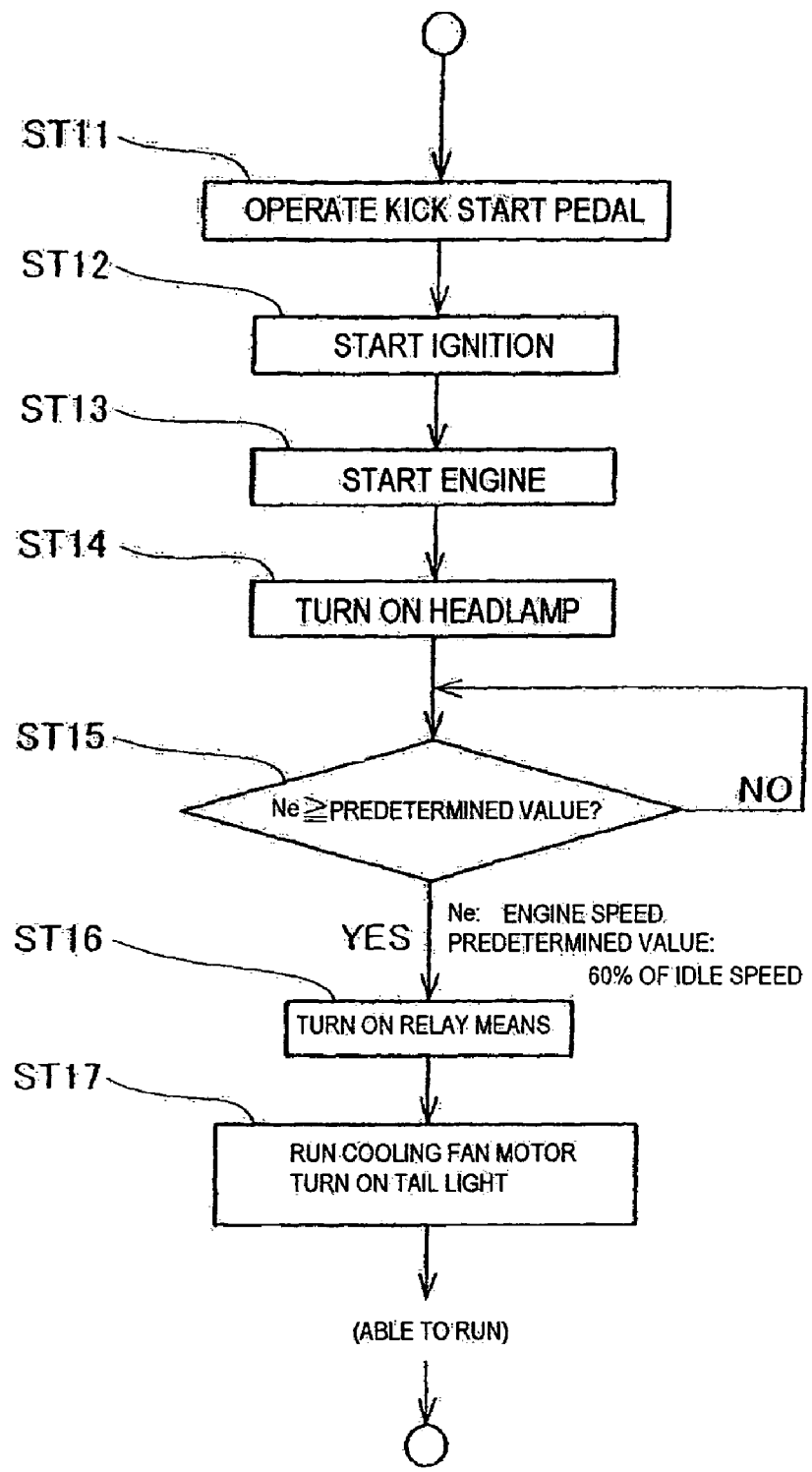
FIG. 8 is an operational flowchart for starting the vehicle through kick starting.

FIG. 8 is an operation flowchart for the starting of the vehicle through kick starting.

ST11: The kick start pedal is depressed for activation.

ST12: A crankshaft of the engine turns and current is supplied from the generator to the ignition coil 68 through the ignition control unit 67, thus causing the spark plug to produce a prescribed spark.

ST13: This starts the engine.

ST14: At the same time, current is supplied from the generator 66 to the headlight, thus turning on the headlight.

ST15: A determination is made as to whether or not the engine speed Ne has reached a predetermined value (e.g., 60% of the idle speed).

ST16: If an affirmative determination is made in ST15, the relay means is turned on.

ST17: This causes the cooling fan motor as a general load to start turning, and the tail light to light up.

The vehicle is now able to run, since energization of the general load has been started and the engine is in a rotating state.

To bring the engine that has been started to a stop, it is necessary to simply press the engine stop switch 35 shown in FIGS. 3 and 6.

In accordance with the preferred embodiment of the present invention, the invention is applied to a motorcycle. The present invention is nonetheless applicable to a three-wheeled vehicle and a four-wheeled vehicle. The present invention is therefore applicable to a general vehicle. The present invention is preferably applied to a vehicle not provided with any principal switch.

In this detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

We claim:

1. A handlebar steered vehicle, comprising:

an operation lever provided on the steering handlebar;

an operation detection switch for detecting an operation of the operation lever;

a starting circuit including a starting switch for connecting a battery with a starter motor, the operation detection switch and the starting switch being connected in series with the battery, such that the battery and the starter motor are connected to each other when the operation detection switch and the starting switch are turned on;

a control unit for driving a relay to connect the battery to a vehicle load when an engine speed reaches or exceeds a predetermined value, a throttle housing mounted on the handlebar;

a protrusion extending from said throttle housing; and a switch box, supporting said starting switch, said switch box having two tabs forming a recess therebetween, and wherein said switch box is mounted on the handlebar such that said protrusion fits into said recess, wherein said operation lever is disposed on a side of the steering handlebar opposite to a side on which said starting switch is provided.

2. The handlebar steered vehicle according to claim 1, further comprising:

a generator for generating electricity in response to an output from an engine; and a headlight directly connected to said generator.

3. The handlebar steered vehicle according to claim 2, wherein said control unit is an ignition control unit for the vehicle.

4. The handlebar steered vehicle according to claim 1, wherein said control unit is an ignition control unit for the vehicle.

5. The handlebar steered vehicle according to claim 1, wherein said operation lever is a clutch lever.

6. The handlebar steered vehicle according to claim 1, wherein said operation lever is a front brake lever.

7. The handlebar steered vehicle according to claim 1, further comprising:

a reinforcing rib provided on said protrusion.

* * * * *